(12) United States Patent
Asnaashari et al.

(10) Patent No.: US 9,483,632 B2
(45) Date of Patent: Nov. 1, 2016

(54) INTELLIGENT CONTROLLER SYSTEM AND METHOD FOR SMART CARD MEMORY MODULES

(71) Applicant: Micron Technology, Inc., Boise, ID (US)

(72) Inventors: Mehdi Asnaashari, Danville, CA (US); Ruchirkumar D. Shah, San Jose, CA (US); Sylvain Prevost, Austin, TX (US); Ksheerabdhi Krishna, Cedar Park, TX (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 14/805,274

(22) Filed: Jul. 21, 2015

(65) Prior Publication Data

US 2015/0324575 A1 Nov. 12, 2015

Related U.S. Application Data

(63) Continuation of application No. 13/448,172, filed on Apr. 16, 2012, now Pat. No. 9,111,045, which is a continuation of application No. 11/938,734, filed on Nov. 12, 2007, now Pat. No. 8,162,227.

(51) Int. Cl.
*G06F 21/34* (2013.01)
*G06F 21/44* (2013.01)
(Continued)

(52) U.S. Cl.
CPC ............ *G06F 21/44* (2013.01); *G06F 13/387* (2013.01); *G06F 21/34* (2013.01); *G06F 21/77* (2013.01); *G06F 21/79* (2013.01); *G06K 19/073* (2013.01); *G06K 19/0715* (2013.01)

(58) Field of Classification Search
USPC ....................................................... 235/492
See application file for complete search history.

(56) References Cited

U.S. PATENT DOCUMENTS 5,623,637 A 4/1997 Jones et al.
5,901,311 A 5/1999 Labatte et al.
(Continued)

FOREIGN PATENT DOCUMENTS

CN 102307188 1/2012
EP 1549020 A2 6/2005
(Continued)

OTHER PUBLICATIONS

Mavrogiannopoulos, et al., "Security implications in Kerberos by the introduction of smart cards", ASIACCS '12: Proceedings of the 7th ACM Symposium on Information, Computer and Communications Security; Publisher: ACM, Apr. 2012, pp. 1-5.
(Continued)

*Primary Examiner* — Michael G Lee
*Assistant Examiner* — David Tardif
(74) *Attorney, Agent, or Firm* — Dorsey & Whitney LLP

(57) ABSTRACT

A storage device contains a smart-card device and a memory device, both of which are accessed though a controller. The storage device may be used in the same manner as a conventional smart-card device, or it may be used to store a relatively large amount of data in various partitions corresponding to the protection level of the data stored therein. The smart-card device stores critical security parameters that are provided to the controller to protect access to some or all of the partitions of the memory device. A host connected to the controller issues commands, and the controller analyzes the commands and responds to them in various ways depending upon the nature of the command. In particular, depending upon the nature of the command, the controller may either pass the command to the smart-card device, or ignore the command either indefinitely or until a predetermined event has occurred.

20 Claims, 2 Drawing Sheets

(51) Int. Cl.
*G06K 19/073* (2006.01)
*G06K 19/07* (2006.01)
*G06F 13/38* (2006.01)
*G06F 21/77* (2013.01)
*G06F 21/79* (2013.01)

(56) References Cited

U.S. PATENT DOCUMENTS

| | | |
|---|---|---|
| 6,330,653 B1 | 12/2001 | Murray et al. |
| 7,162,645 B2 | 1/2007 | Iguchi et al. |
| 7,370,166 B1 | 5/2008 | Ramesh et al. |
| 7,953,985 B2 | 5/2011 | Nishimura et al. |
| 8,156,322 B2 | 4/2012 | Asnaashari et al. |
| 8,162,227 B2 | 4/2012 | Asnaashari et al. |
| 8,286,883 B2 | 10/2012 | Asnaashari et al. |
| 8,504,849 B2 | 8/2013 | Jogand-Coulomb et al. |
| 8,746,578 B2 | 6/2014 | Asnaashari et al. |
| 8,930,711 B2 | 1/2015 | Asnaashari et al. |
| 2001/0041593 A1 | 11/2001 | Asada |
| 2003/0154355 A1 | 8/2003 | Fernandez |
| 2004/0059916 A1 | 3/2004 | Mizushima et al. |
| 2004/0088562 A1 | 5/2004 | Vassilev et al. |
| 2004/0103288 A1 | 5/2004 | Ziv et al. |
| 2004/0143730 A1 | 7/2004 | Wen et al. |
| 2004/0149827 A1 | 8/2004 | Zuili |
| 2004/0232247 A1 | 11/2004 | Tsunoda et al. |
| 2004/0255145 A1 | 12/2004 | Chow |
| 2005/0035200 A1 | 2/2005 | Hendrick |
| 2005/0045717 A1* | 3/2005 | Rager ............. G06F 8/67 235/383 |
| 2005/0086471 A1 | 4/2005 | Spencer |
| 2005/0279826 A1 | 12/2005 | Merrien |
| 2006/0043202 A1 | 3/2006 | Kim et al. |
| 2006/0117190 A1 | 6/2006 | Morita |
| 2006/0126422 A1 | 6/2006 | Takagi et al. |
| 2006/0138217 A1 | 6/2006 | Connelly et al. |
| 2006/0174352 A1 | 8/2006 | Thibadeau |
| 2006/0184806 A1 | 8/2006 | Luttmann et al. |
| 2006/0198515 A1 | 9/2006 | Forehand et al. |
| 2006/0218331 A1 | 9/2006 | James |
| 2006/0289659 A1 | 12/2006 | Mizushima |
| 2007/0002612 A1 | 1/2007 | Chang et al. |
| 2007/0043667 A1 | 2/2007 | Qawami et al. |
| 2007/0101418 A1* | 5/2007 | Wood ............. G06F 21/31 726/8 |
| 2007/0106581 A1 | 5/2007 | Mitchell et al. |
| 2007/0113097 A1 | 5/2007 | Wang |
| 2007/0214369 A1 | 9/2007 | Roberts et al. |
| 2007/0228154 A1* | 10/2007 | Tran ............. G06K 7/0008 235/380 |
| 2007/0272752 A1* | 11/2007 | Nakatsugawa ...... G06F 21/35 235/451 |
| 2008/0052532 A1 | 2/2008 | Akkar et al. |
| 2008/0162784 A1 | 7/2008 | Obereiner et al. |
| 2009/0121028 A1 | 5/2009 | Asnaashari et al. |
| 2009/0121029 A1 | 5/2009 | Asnaashari et al. |
| 2009/0254715 A1 | 10/2009 | Jeong |
| 2010/0023747 A1 | 1/2010 | Asnaashari et al. |
| 2010/0229004 A1 | 9/2010 | Asnaashari |
| 2010/0313277 A1* | 12/2010 | Pepin ............. G06F 21/6218 726/30 |
| 2012/0191975 A1 | 7/2012 | Asnaashari et al. |
| 2012/0204018 A1 | 8/2012 | Asnaashari et al. |
| 2013/0010519 A1 | 1/2013 | Asnaashari et al. |
| 2013/0138972 A1 | 5/2013 | Asnaashari |
| 2014/0229745 A1 | 8/2014 | Asnaashari et al. |
| 2015/0156022 A1 | 6/2015 | Asnaashari et al. |
| 2015/0280912 A1 | 10/2015 | Asnaashari et al. |

FOREIGN PATENT DOCUMENTS

| | | |
|---|---|---|
| EP | 1577780 A1 | 9/2005 |
| EP | 2525595 A1 | 11/2012 |
| JP | 62-236055 | 10/1987 |
| JP | 08-167013 | 6/1996 |
| JP | 2001-320768 A | 11/2001 |
| JP | 2002-229861 | 8/2002 |
| TW | I234785 | 6/2004 |
| TW | 200623121 A | 7/2006 |
| WO | 2004055680 A1 | 7/2004 |
| WO | 2006120938 A1 | 6/2006 |
| WO | 2006/101292 A1 | 9/2006 |
| WO | 2008/008326 A2 | 1/2008 |
| WO | 2008008326 A2 | 1/2008 |
| WO | 2009/064631 A2 | 5/2009 |
| WO | 2009/064634 | 5/2009 |

OTHER PUBLICATIONS

TW Office Action and Search Report for TW Application No. 097143737 issued May 29, 2012.
Extended European Search Report dated Jul. 19, 2011 for European Patent Application No. 08848669.1, 6 pgs.
International Search Report and Written Opinion dated Apr. 30, 2009 for International Application No. PCT/US2008/082259, 11.
International Search Report and Written Opinion dated Jun. 12, 2009 for International Application No. PCT/US2008/082274.
International Search Report and Written Opinion dated May 29, 2009 for International Application No. PCT/US2008/082312.
Extended Search report dated Jan. 7, 2013 for EP app No. 08850219.0.
Wu, et al., "A Low Cost and Inner-Round Pipeline Design of ECB-AES-256 Crypto Engine for Solid State Disk", 2010 Fifth IEEE International Conference on Networking, Architecture, and Storage, p. 485-491.
Yang, Hsin-Jung et al., "Authenticated storage using small trusted hardware", CCSW '13: Proceedings of the 2013 ACM workshop on Cloud computing security workshop; ACM, Nov. 2013, 35-46.

\* cited by examiner

INTELLIGENT CONTROLLER SYSTEM AND METHOD FOR SMART CARD MEMORY MODULES

CROSS REFERENCE TO RELATED APPLICATION(S)

This application is a continuation of pending U.S. application Ser. No. 13/448,172 filed Apr. 16, 2012, which is a continuation of U.S. patent application Ser. No. 11/938,734, filed Nov. 12, 2007, and issued as U.S. Pat. No. 8,162,227 on Apr. 24, 2012, the applications and patents of which are incorporated herein by reference, in their entirety, for any purpose.

TECHNICAL FIELD

Embodiments of the present invention relate generally to smart-card devices, and, more particularly, to systems and methods for protecting data stored in modules containing smart-card devices and memory devices.

BACKGROUND OF THE INVENTION

Chip cards or integrated circuit cards, both of which are commonly known as smart-cards, TPM (trusted platform Module) ICs, or the like, are devices with an embedded integrated circuit, such as a processor and/or limited capacity, non-volatile memory device. The memory device may be an EEPROM (electrically eraseable programmable read only memory) or the like, and it may store an operating system for the processor as well as smart-card applications, such as electronic banking applications, telephone applications in the case of SIM (subscriber identity module) smart-cards, or the like. The memory device may also store user authentication protocols, personalization data, such as telephone or bank account data or the like, user data, such as financial data or the like, private data, such as private keys and/or certificates used in various encryption techniques, etc. User data may be secured using a PIN (personal identification number) or a password as an access control measure. In order to access the protected data stored in the card's memory device, a user must be authenticated by providing the correct PIN or password.

FIG. 1 is a block diagram of a prior art integrated circuit, such as an integrated smart-card device 100, a SIM card, an electronic transaction card, an electronic identification card, a trusted platform Module ("TPM"), or the like, of the prior art. A central processing unit ("CPU") 105 is embedded in smart-card device 100 and may include a processor 110 and an integrated random access memory ("RAM") 120, a non-volatile memory 115, such as an EEPROM or flash memory, and a read only memory ("ROM") 125. The processor 110 may include a cryptography engine 126, such as an advanced encryption system ("AES") encryption engine, as a portion of access control circuitry of CPU 105, that can perform AES protocols, user authentication protocols, such as Public Key Infrastructure ("PKI") authentication, encryption and decryption of data, etc. An input/output interface 127 is in communication with the CPU 105 and may be a USB (universal serial bus) interface for connecting directly to a host 118, such as a personal computer, a contactless interface, an ISO 7816 interface for use with an ISO 7816 card reader, etc. The ROM 125 typically stores the operating system of smart-card device 100. The smart-card device 100 may also include a file management system 130 that may be used to manage the address space of the non-volatile memory 115, and a key management system 135 for managing and storing one or more encryption and/or decryption keys, such as one or more AES encryption and/or decryption keys or the like. The non-volatile memory 115 or the key management system 135 may store private keys, certificates that may include public keys as part of public/private key encryption, applications, such as electronic banking applications, telephone applications, etc. The non-volatile memory 115 may further include upgrades or patches for the smart-card operating system.

During operation, the smart-card device 100 is placed in communication with a host 118 via a card reader, for example. An identifier, such as PIN or password, is input into the host 118 by as user. The reader may then pass the user-entered identifier on to the smart-card device 100 for verification so that the smart-card can authenticate the user. The smart-card device 100 then indicates to the host 118 that the user is either authenticated or not authenticated. Alternatively, the smart-card device 100 may be in direct communication with the host 118 via a USB interface, for example. In which case, the identifier is input into the host 118 and is then passed directly to the smart-card device 100 via the USB interface for authentication of the user. After user authentication, the processor 110 either decrypts data from the non-volatile memory 115 for output to the host 118, or it encrypts data received from the host 118 for storage in the non-volatile memory 115, e.g., using one or more encryption and/or decryption keys, such as AES keys, from the key management system 135.

Although the smart-card device 100 includes the non-volatile memory 115, the capacity of the memory 115 is normally very limited. Therefore, larger and more costly embedded integrated memory may be needed in order to meet a demand for increased storage capacity for storing additional and/or more complex applications, user data, etc. This could be provided by including a separate non-volatile memory device packaged with, and coupled to, the smart-card device 100. However, although it may be relatively easy to protect data stored in the memory 115 of the smart-card device 100, it would be substantially more difficult to protect data by encryption or other means if the data are stored in a separate memory device that is packaged with the smart-card. In part, the difficulty of protecting data stored in a separate memory device would be due to the fact that the host 118 can apply commands to the smart-card device to which the smart-card device may respond by providing information to the host 118 that either should be protected or would allow information to be obtained about data that should be protected. For example, a host, such as a personal computer, could issue a "provide key" command to the smart-card device, and the smart-card device could provide a cryptographic command key in response to the command.

There is therefore a need for a system and method for protecting data stored in an integrated memory device that is packaged with a smart-card device to provide a smart-card having a large capacity of protected data storage.

DETAILED DESCRIPTION

Figure 1:
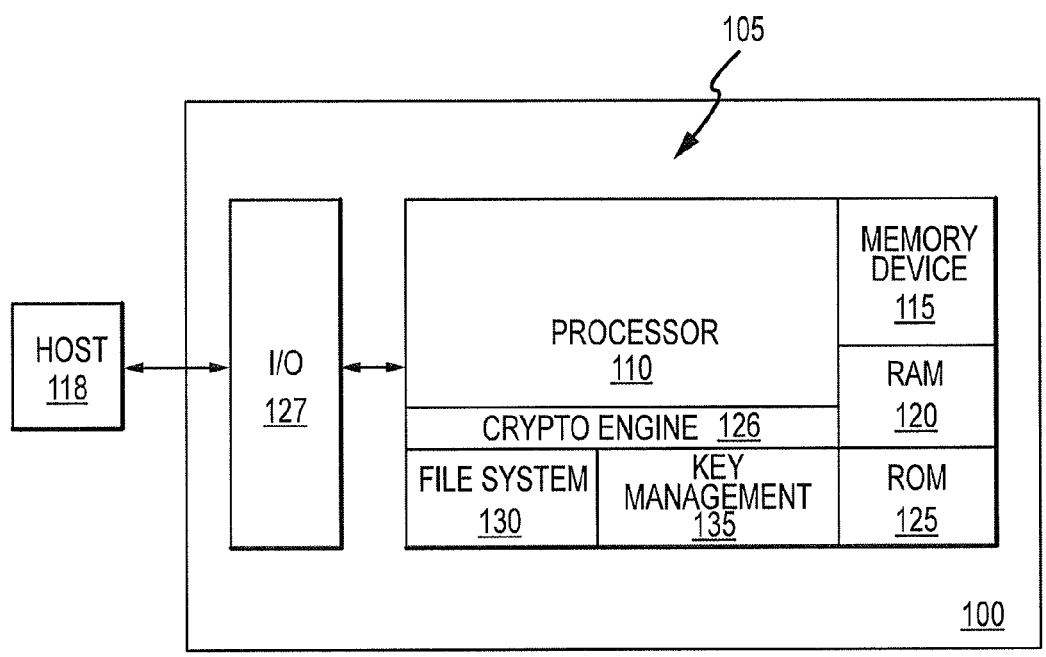
FIG. 1 is a block diagram of one embodiment of a prior art integrated smart-card device.
Figure 2:
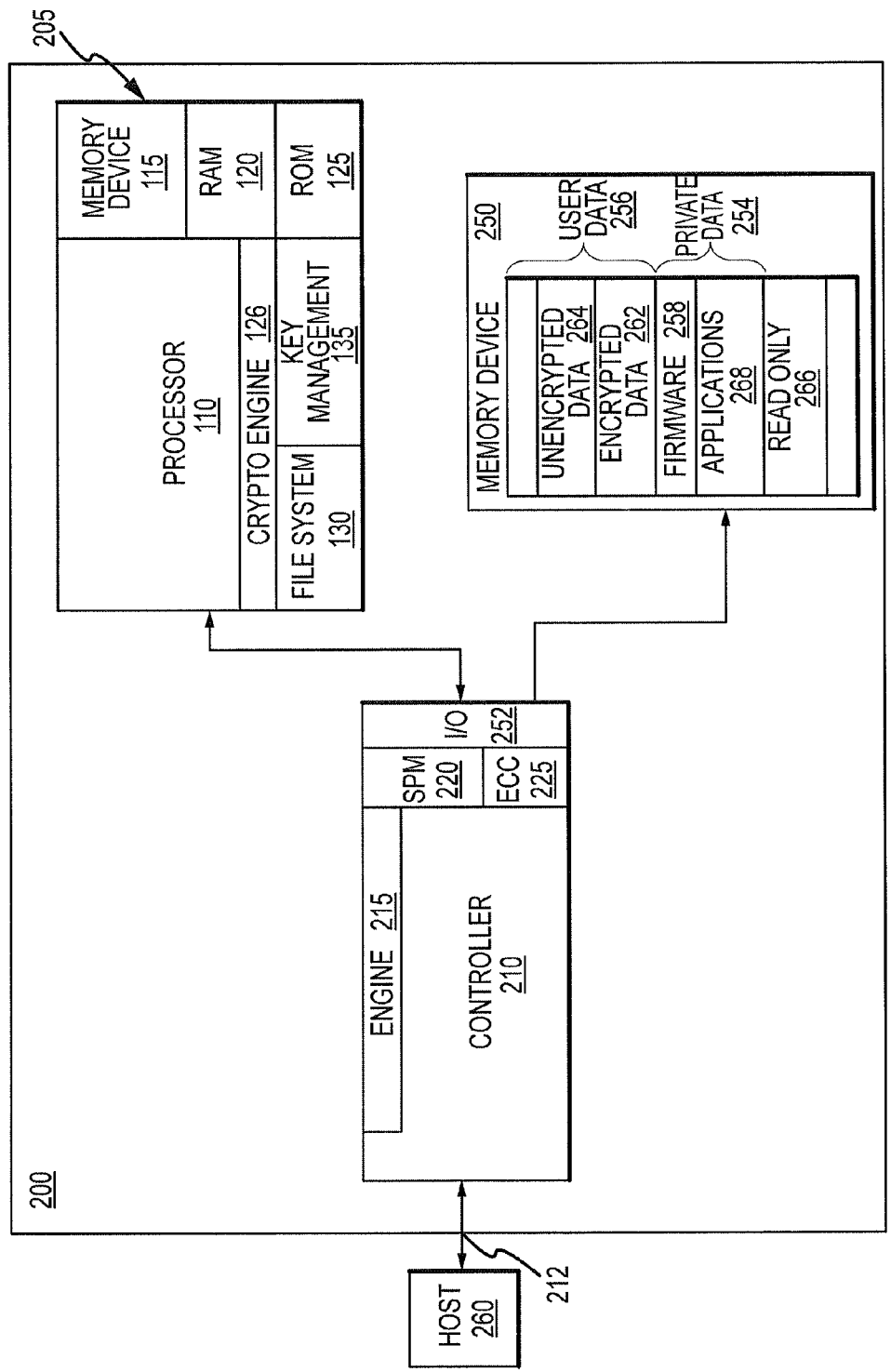
FIG. 2 is a block diagram of a storage device according to an embodiment of the invention in which an integrated smart-card device and a memory device are connected to each other and an access port through a controller.

FIG. 2 is a block diagram illustration of a storage device 200, e.g., a smart storage device, according to an embodiment of the invention. Many of the components used in the storage device 200 are the same or substantially the same as components are used in the smart-card device 100 shown in FIG. 1. Therefore, in the interest of brevity, an explanation of these components will not be repeated, and the same reference numerals will be used in FIG. 2. The storage device 200 may include a smart-card device 205 having components similar to those of smart-card device 100, such as access control circuitry and integrated memory, e.g., for authenticating a user to storage device 200, storing and managing one or more encryption and/or decryption keys, such as AES keys, private keys, etc. Although the term "smart-card" device may be used herein to describe all of the components shown in the smart-card device 205 of FIG. 2, it will be understood that various components may be omitted without preventing the smart-card device 205 from functioning as a smart-card device.

Storage device 200 may include a separate controller 210, such as a memory controller, e.g., a flash memory controller, through which signals are coupled between an access port 212 and the smart-card device 205. In one embodiment, the smart-card device 205 and the controller 210 may be integrated separately on separate chips disposed on a circuit board. The access port 212 may be connected to a host 260 that may be, for example, a personal computer. Alternatively, the host 260 may be a card reader or some other device that is in communication with a personal computer or other device.

In the storage device 200 embodiment shown in FIG. 2, the controller 210 includes a cryptography engine 215, such as cryptography engine, e.g., an AES cryptography engine. The controller 210 may include space management sector system 220 to manage the address space of a non-volatile memory device 250 with which the controller 210 is connected, and it may include an error correction engine 225, for correcting any data retention errors that may be present in data read from the memory device 250. In one embodiment, the memory device 250 is integrated separately on a separate chip from the smart-card device 205 and the controller 210, although the memory device 250, smart-card device 205 and controller 210 are packaged together in, for example, a package similar to a USB flash drive or a credit card. The nature of the access port 212 will depend upon the nature of the other device with which it is used. The access port 212 may be an electronic port, such as a USB connector, a magnetic signal port, such as the type commonly used in access control cards, an optical port, a wireless port, or any other type of port that can allow communication between the storage device 200 and another device.

The non-volatile memory device 250 may be a flash memory device, e.g., a NAND flash memory device, and it is connected to the controller 210 via an input/output interface 252, such as a flash memory interface. The input/output interface 252 may include a combined command/address bus, and a bi-directional data bus, as is typical for flash memory devices. The interface 252 may, of course, use other types of communications links, such as a high-speed link with one or more lanes through which all signals are coupled, or a more conventional memory device bus system including a command bus through which memory commands are coupled from the controller 210 to the memory device 250, an address bus through which addresses are coupled from the controller 210 to the memory device 250, and a data bus over which write data are transmitted from the controller 210 to the memory device 250 and read data are received by the controller 210 from the memory device 250.

The memory device 250 may be divided into a plurality of partitions, such as a private data partition 254, which may or may not be accessible to a user, and a user data partition 256, which is accessible to the user. In one embodiment, the private data partition 254 may include a firmware partition 258 that contains firmware for controlling operations on a memory array of the memory device 250 in response to control and address signals from the controller 210. In another embodiment, the private data portion 254 may include an applications partition 268 that stores smart-card applications, such as electronic transaction applications, electronic banking applications, telephone applications, etc., that might otherwise be stored in the non-volatile memory 115 of the smart-card device 205. Storing smart-card applications in the memory device 250 instead of in the non-volatile memory 115 facilitates a reduction of the memory requirements of the non-volatile memory 115 and thus the size of the non-volatile memory 115 that would otherwise be required when these applications are stored in the smart-card device 205. In addition, storing smart-card applications in the memory device 250 enables the storage of larger and more sophisticated smart-card applications and the storage of a larger number of applications compared to when smart-card applications are stored in the non-volatile memory 115 of the smart-card device 205. In one embodiment, the applications may be stored in the memory device 250 during fabrication of the memory device 250. In another embodiment, the applications data and/or other data may be encrypted before they are stored in the memory device 250. For this reason, the user data partition 256 may be partitioned into an encrypted data partition 262 storing data in encrypted form, and an unencrypted data partition 264 storing data in unencrypted form. Finally, the private data partition 254 may include a read only partition 266 containing application programs that are executed by the host 260 that is connected to the storage device 200. The application programs include an auto execute command so that they are automatically executed on the host 260 either when the storage device is connected to the host 260 or another device or when a user logs onto an operating system running on the host 260.

During use, it may be necessary to authenticate the storage device 200. There are basically two ways to authenticate the storage device 200. If the host 260 to which the storage device 200 is connected is a personal computer or the like, the user may log onto an operating system, such as Microsoft Windows® Vista®. In doing so, the user will enter a PIN, password or other identifier into the host 260. The host 260 then provides the PIN, password or other identifier and a series of specific commands to the controller 210 in the storage device 200, and the controller passes the PIN, password or other identifier to the smart-card device 205 for verification to authenticate the user. The smart-card device 205 compares the PIN, password or other identifier entered through the host 260 with a corresponding PIN, password or other identifier stored in the non-volatile memory 115 or the key management system 135 of the smart-card device 206. The smart-card device 205 may then transmit an authentication signal to the host 260 indicating whether or not the identifier is correct and thus whether or not the user is authenticated.

The controller 210 detects the authentication signal issued by the smart-card device 205 and a responds with a request for verification from the smart-card device 205. If the smart-card 205 was truly authenticated, it will issue a first type of verification signal. As mentioned above, the host 260 issues a series of specific commands to the controller 210 along with the PIN, password or other identifier. The controller 210 is configured to look for and detect these commands. If these and the verification signal from the smart-card device 205 are detected by the controller 210, the controller 210 issues a "get key" command to the smart-card device 205. Then, and only then, does the smart-card device send an encryption and/or decryption key to the controller 210 for use by the cryptography engine 215 in the controller 210. Thus, in response to a logon through the host 260, both the host 260 and the storage device 200 are authenticated.

As mentioned above, there is a way to authenticate the storage device 200 other than by logging onto an operating system running on the host 260. The other way is used when the storage device 200 is placed in communication with a terminal or other device. In such case, an auto-execute application stored in the read only partition 266 of the memory device 250 is executed by a processor in the terminal or other device. The application causes a display screen or other user interface device to request the entry of a PIN, password or other identifier. A user responds by entering the PIN, password or other identifier into a keyboard, keypad or other user interface device in the terminal or other device. The terminal or other device then sends the PIN, password or other identifier to the smart-card device 205, which uses it to authenticate the user in the manner described above. The smart-card device 205 may then transmit an authentication signal to the terminal or other device indicating whether or not the identifier is correct and thus whether or not the user is authenticated.

The controller 210 again detects the authentication signal issued by the smart-card device 205 and a responds with a request for verification from the smart-card device 205. If the smart-card 205 was authenticated, it will issue a second type of verification signal that is different from the first verification signal issued by the smart-card device 205 for a host operating system logon. However, for a logon using a terminal or other device, the storage device 200 does not receive a specific series of commands with the PIN, password or other identifier. As a result, the controller 210 issues a "get key" command to the smart-card device 205 in response to receiving the second type of verification signal. Thus, in contrast to a host logon in which both the host and the storage device 200 are authenticated, a logon through a terminal or other device only authenticates the storage device 200.

In response to the "get key" command, the smart-card device 205 sends to the controller 210 critical security parameters ("CSP's"), such as an encryption and/or decryption keys, which may be stored in the memory device 115 or the key management system 135 of the smart-card device 205. However, the smart-card device 205 will send the CSP's to the controller 210 only if the smart-card device 205 has authenticated a user as described above. If the user has not been authenticated, the smart-card device 205 will not send any CSP's to the controller 210. It is therefore ultimately the smart-card device 205 that provides the user authentication since the smart-card device 205 is likely to be less vulnerable to tampering than the other components of the storage device 200. Alternatively, the processor 110 may run an application that generates CSP's, either by itself or based on CSP's stored in the memory device 115 or the key management system 135. The CSP's may also be a type of security information other than an encryption and/or decryption key, such as a password or certificate. If the CSP's are encryption and/or decryption keys, they may be either symmetric keys in which the same key is used for both encryption and decryption, or they may be asymmetric keys, in which different keys are used for encryption and decryption. The controller 210 may receive one or more of the CSP's from the smart-card device 205 for use by the cryptography engine 215.

By inhibiting the smart-card device 205 from sending the CSP's to the controller 210 until the sequence of signals described above has been completed, the CSP's are more securely protected. For example, someone cannot obtain the CSP's by injecting a "get key" command in the smart-card device 205 on the connections between the smart-card device 205 and the controller 210 since the smart-card device will not provide the CSP's in response to the command.

Once the smart-card device 205 has sent an encryption key to the cryptography engine 215, it can encrypt data received from through the access port 212 and stored in the memory device 250. The data will then be stored in the memory device 250, such as in the encrypted data partition 264 of the memory device 250. The cryptography engine 215 may also receive from the smart-card device 205 a decryption key that it will use to decrypt data read the memory device 250 so that the data will be output from the access port 212 in unencrypted form. The cryptography engine 215 thus performs encryption and/or decryption using the one or more encryption and/or decryption keys from smart-card device 205 independently of the cryptography engine 126 of the smart-card device 205.

In some embodiments, the processor 110 in the smart-card device 205 may run the smart-card applications stored in the applications partition 268 or elsewhere in the memory device 250. The applications may be stored in the memory device 250 in either encrypted or unencrypted form. If the applications are to be stored in encrypted form, they may be decrypted by the cryptography engine 215 in the controller 210 using a key received from the smart-card device 205 in a protected manner, such as when a user's password is determined to be correct. The controller 210 then transmits the unencrypted applications to the smart-card device 205 for storage in the RAM 120 from where they are executed by the processor 110. In another embodiment, the controller 210 may be operated in the bypass mode, which places smart-card device 205 in direct communication with memory device 250, so that the processor 110 in the smart-card device 205 can run one or more smart-card applications 260 directly from the memory device 250.

In another embodiment, private data, such as smart-card applications stored in the applications partition 268 and/or updates to firmware stored in the firmware partition 258, may be downloaded from the host 260 when the host 260 is in communication with the Internet, for example. The private data may include an identifier, such as a password or key, such as a public key, that is authenticated at the smart-card device 205. For example, the host 260 may transmit the identifier for the private data to the smart-card device 205, and the smart-card device 205 may determine whether or not the identifier is correct.

In another embodiment, the controller 210 may permit access to different partitions in the memory device depending on the level of access it grants. For example, an administrator may be permitted to read from and write to the applications partition 268 as well as both user data partitions 256, while a user may be limited to accessing only the user data partitions 256.

In many respects, the controller 210 performs the function of a conventional card reader that is used to couple a host to the smart card device 205. Typically, the host issues a command, and the smart-card reader passes the command onto the smart card device, albeit in a different format. However, the controller 210 in the storage device 200 is configured so that it does not simply pass certain received commands on to the smart-card device 205. If the controller 210 did simply pass on to the smart-card device 205 some of these commands, then the identity of CSP's stored in the memory 115 or the key management system 135 could be discovered. The controller 210 is configured to prevent this from happening by analyzing all commands issued by the host 260 to determine how an issued command should be handled. If the controller 210 determines that a command should not be passed on to the smart-card device 205, it blocks the command from being passed on to the smart-card device 205. Further, only the controller 210 can issue a "get key" command to the smart-card device 205, and it does so only after the logon procedures described above have been followed. This potential problem does not exist in the use of the smart-card device 100 shown in FIG. 1 because the smart-card device 100 is configured to use any CSP's stored in the memory 115 or the key management system 135 only internally. In contrast, the smart-card device 205 may be configured to send CSP's stored in the memory 115 or the key management system 135 of the smart-card device 205 externally to the controller 210 for use by the cryptography engine 215 in the controller 210.

Another command issued by the host 260 that the controller 210 may ignore unless it has been properly authenticated is a "resizing" command to resize various partitions in the memory device 250. If the host 260 could change the size of the partitions, then it could reduce the size of the encrypted data partition 262, thereby placing such data in the unencrypted data partition 264 and thus accessible without the same level of protection provided to the data stored in the encrypted data partition 262. Once the storage device 200 has been authenticated at the proper level, the controller 210 may pass resizing command issued by the host 260 on to the space management sector system 220 to resize the user data partitions 256 in the memory device 250.

Another "intelligent" function performed by the controller 210 is to synchronize the authentication state of the smart-card device 205 to the authentication state of the controller 210 after the smart-card device 205 has been powered down. Once the smart-card device 205 has been used to authenticate the storage device 200 and the host 260 is accessing the memory device 250, the smart-card device 205 may no longer be needed for all or part of a remaining session during which the storage device 200 is used. The host 260 may therefore issue the smart-card device 205 a "power down" command, which is conventionally issued to a smart-card device when it is no longer needed. The host 260 can thereafter continue to access the memory device 250. If the smart-card device 205 is subsequently needed, the host 260 will issue a "power up" command to the smart-card device 205. When a smart-card device, including the smart-card device 205, is initially powered, it places itself in a reset state. As a result, the smart-card device 205 will be in the reset state even though it should be in the authenticated state so that it can be used by the host 260. To solve this problem, the controller 210 is configured to detect the "power up" command issued by the host 260 to the smart-card device 205. Upon detecting the "power up" command, the controller 210 issues a "re-sync" command to the smart-card device 205 that causes the smart-card device 205 to synchronize itself to the authentication state of the controller 210. The controller 210 and the smart-card device will then be in sync for usage of the secure storage portion of the memory device 250, and the smart-card device 205 will be able to properly respond to commands relating to such storage, such as firmware updates. If the controller 210 was in the authenticated state, the smart-card device 205 will then be in the authenticated state and thus usable by the host 260. If the controller 210 was not in the authenticated state, the smart-card device 205 will also not be in the authenticated state and it will thus be usable by the host 260. If the storage device 200 has multiple levels of authentication, such as a user authentication level and an administrator authentication level, the "re-sync" command may synchronize itself to the same level of authentication as the controller 210.

The controller 210 thus has the intelligence to analyze the commands issued by the host 260, and to respond to the commands in various ways depending upon the nature of the command. For some commands, like a "power down" command, the controller 210 responds to a command by issuing a corresponding command to the smart-card device 205. Other commands, like a "get key" command, are simply ignored by the controller 210, and the controller 210 instead may issue the ignored command itself once proper procedures have been followed. If the controller 210 ignores a command sent by the host 260, it will send to the host 260 an "unsuccessful" status message. Still other commands, such as a "re-size" command, are sent by the controller 210 to the smart-card device 205 for validation. Once the command has been validated, the controller 210 issues commands as appropriate to carry out the commanded function. By analyzing commands and responding in different ways, the controller 210 provides necessary functionality to the storage device 200, but it does so without impairing the security of the storage device 200.

From the foregoing it will be appreciated that, although specific embodiments of the invention have been described herein for purposes of illustration, various modifications may be made without deviating from the spirit and scope of the invention. For example, the term "smart-card device" may include a device containing all of the components in the smart-card device 205. However, various components may be omitted from a device without preventing the device from being considered a smart-card device. For example, the RAM 120 and the ROM 125 may be omitted, and the data that would normally be stored in both the RAM 120 and the ROM 125 may be stored in the memory device 115. Additionally, the file system 130, key management system 135 and cryptography engine 126 may be omitted. A smart-card device will generally have some type of processor, which need not be a full-features processor such as a microprocessor. A reduced capability processor, such as a controller, may be used in some embodiments. A smart-card device will generally also have some type of non-volatile storage, such as the memory device 115. However, the storage need not be separate from the processor 110 and may, in some embodiments, be integrated in the processor 110. Accordingly, the invention is not limited except as by the appended claims.

What is claimed is:

1. An apparatus comprising:
   a smart-card device;
   a non-volatile memory device packaged with the smart-card device; and
   a controller configured to analyze commands issued to the smart-card device or the non-volatile memory device, the controller further configured to:
   issue to the smart-card device a command to power down the smart-card device responsive, at least in part, to receipt of a power down command; and access the non-volatile memory device while the smart-card device is powered down.

2. The apparatus of claim 1, wherein the controller is further configured to issue a synchronization command to the smart-card device and the non-volatile memory device responsive, at least in part, to receipt of a power-up command.

3. The apparatus of claim 1, wherein the controller is further configured to selectively ignore a command to obtain a critical security parameter.

4. The apparatus of claim 3, wherein the critical security parameter is stored in the smart card device.

5. The apparatus of claim 3, wherein the critical security parameter comprises an encryption key.

6. The apparatus of claim 1, wherein the non-volatile memory device comprises a plurality of partitions.

7. The apparatus of claim 6, wherein each of the plurality of partitions corresponds to a respective set of authentication states.

8. The apparatus of claim 7, wherein the respective set of authentication states includes a user authentication level and an administrator authentication level.

9. The apparatus of claim 6, wherein the controller is further configured to resize at least one of the plurality of partitions responsive to receiving a resize command.

10. The apparatus of claim 1, wherein the non-volatile memory device comprises a flash memory device.

11. A method comprising:
accessing a non-volatile memory of a storage device including a smart-card device while the smart-card device is powered down;
powering up the smart-card device responsive, at least in part, to receipt of a power up command; and
synchronizing an authentication state of the smart-card device to an authentication state of the storage device responsive, at least in part, to said powering up the smart-card device.

12. The method of claim 11, wherein the authentication state of the storage device comprises an unauthenticated state.

13. The method of claim 11, wherein synchronizing the authentication state of the smart-card device to the authentication state of the storage device comprises providing a synchronize command to the smart-card device from a controller.

14. The method of claim 11, further comprising authenticating the storage device with the smart-card device responsive, at least in part, to receipt of an authentication signal.

15. The method of claim 14, wherein the authentication signal is received at the storage device.

16. The method of claim 14, wherein authenticating the storage device with the smart-card device comprises receiving an identifier at the smart card device and examining the identifier to determine whether the identifier corresponds to a valid identity.

17. The method 16, further comprising:
receiving a command to obtain a critical security parameter, wherein
if the identity has not been determined to be valid, ignoring the command to obtain a critical security parameter, and
if the identity has been determined to be valid, selectively ignoring the command to obtain the critical security parameter.

18. The method of claim 16, further comprising authenticating a host responsive, at least in part, to the identifier corresponding to the valid identity.

19. The method of claim 11, wherein powering up the smart-card device comprises operating the smart card in a reset state.

20. The method of claim 11, further comprising: powering down the smart-card device responsive, at least in part, to receipt of a power down command.

* * * * *